United States Patent

Nuñez et al.

[11] Patent Number: 5,490,960
[45] Date of Patent: Feb. 13, 1996

[54] METHOD OF FORMING SHAPED HYDROGEL ARTICLES INCLUDING CONTACT LENSES USING INERT, DISPLACEABLE DILUENTS

[75] Inventors: Ivan M. Nuñez, Jacksonville; Frank F. Molock, Orange Park; Laura D. Elliott, Jacksonville; James D. Ford, Orange Park, all of Fla.

[73] Assignee: Johnson & Johnson Vision Products, Inc., Jacksonville, Fla.

[21] Appl. No.: 456,133

[22] Filed: May 31, 1995

Related U.S. Application Data

[62] Division of Ser. No. 96,145, Jul. 22, 1993, Pat. No. 5,457,140.

[51] Int. Cl.$^6$ ............ B29D 11/00; C08L 33/14
[52] U.S. Cl. ............ 264/2.6; 523/106; 524/377; 524/388; 524/916
[58] Field of Search ............ 523/106; 524/377, 524/388, 916; 264/2.6

Primary Examiner—Paul R. Michl
Assistant Examiner—Andrew E. C. Merriam

[57] ABSTRACT

Shaped hydrogel articles such as soft contact lenses are prepared by the steps of:

(1) molding or casting a polymerization mixture comprising:
  (a) a monomer mixture comprising a major proportion of one or more hydrophilic monomers such as 2-hydroxyethyl methacrylate, and one or more crosslinking monomers; and
  (b) an inert, displaceable diluent selected from the group consisting of:
    (i) ethoxylated alkyl glucoside;
    (ii) ethoxylated bisphenol A;
    (iii) polyethylene glycol;
    (iv) mixture of propoxylated and ethoxylated alkyl glucoside;
    (v) single phase mixture of ethoxylated or propoxylated alkyl glucoside and $C_{2-12}$ dihydric alcohol;
    (vi) adduct of $\epsilon$-caprolactone and $C_{2-6}$ alkanediols and triols;
    (vii) ethoxylated $C_{3-6}$ alkanetriol; and
    (viii) mixtures of one or more of (i) through (vii),
  under conditions to polymerize said monomer mixture to produce a shaped gel of a copolymer of said monomers and said diluent; and (2) thereafter replacing said diluent with water.

1 Claim, No Drawings

METHOD OF FORMING SHAPED HYDROGEL ARTICLES INCLUDING CONTACT LENSES USING INERT, DISPLACEABLE DILUENTS

This is a division of application Ser. No. 08/096,145, filed Jul. 22 1993, now U.S. Pat. No. 5,457,140 which is hereby incorporated by reference.

The invention relates to the production of shaped hydrogel articles including soft contact lenses, and more particularly to a method for the direct molding of such articles using a new class of inert, displaceable diluents.

BACKGROUND OF THE INVENTION

Until recently, soft contact lenses of the hydrogel type have been manufactured either by lathe cutting or spin casting. In the lathe cutting method, a lens blank or button of a substantially anhydrous hydrophilic polymer (xerogel) is mechanically cut and polished to a lens shape on a fine lathe, and thereafter is contacted with water or saline to hydrate the polymer and form the desired hydrogel lens. The mechanical steps utilized in the lathe cutting operation are similar to those used in the manufacture of hard contact lenses, except that allowance must be made for swelling of the lens during hydration of the polymer.

In the spin casting method, a small quantity of hydrophilic monomer mixture is placed in a concave, optically polished mold, and the mold is rotated while the monomers are polymerized to form a xerogel lens. The two optical surfaces of the lens are formed simultaneously during polymerization, the outer surface being formed by the concave mold surface and the inner surface being shaped by the joint actions of centrifugal force generated by the rotating mold and surface tension of the polymerization mixture. The lens produced thereby is contacted with water or saline to hydrate the polymer and form a hydrogel lens as in the case of the lathe cut lens.

More recently, an improved process for producing hydrogel contact lenses has been developed, which method is not only more economical than either the lathe cut method or the spin casting method, but it has the advantage of enabling a more precise control over the final shape of the hydrated lens. This new method comprises the direct molding of a monomer mixture wherein said mixture is dissolved in a non-aqueous, displaceable solvent, the mixture is placed in a mold having the precise shape of the final desired hydrogel (i. e., water-swollen) lens, and the monomer/solvent mixture is subjected to conditions whereby the monomer(s) polymerize, to thereby produce a polymer/solvent mixture in the shape of the final desired hydrogel lens. (The polymerization is preferably carried out in a non-aqueous medium because water can interfere with the polymerization reaction and adversely affect the properties of the resulting polymer.) After the polymerization is complete, the solvent is displaced with water to produce a hydrated lens whose final size and shape are quite similar to the size and shape of the original molded polymer/solvent article. Such direct molding of hydrogel contact lenses is disclosed in Larsen, U.S. Pat. No. 4,495,313 and in Larsen et al., U.S. Pat. Nos. 4,680,336, 4,889,664 and 5,039,459.

In Larsen, U.S. Pat. No. 4,495,313 and in Larsen et al., U.S. Pat. Nos. 4,889,664 and 5,039,459, the displaceable diluents disclosed are water-displaceable boric acid esters of polyhydric alcohols. In Larsen et al., U.S. Pat. No. 4,680,336, the displaceable diluents disclosed are water-displaceable organic compounds selected on the basis of their viscosity and their Hansen cohesion parameters relative to the cohesion parameters of the polymeric component of the hydrogel to be prepared.

The present invention is based on the discovery of a new class of compositions that can be used as displaceable diluents in the direct molding of shaped hydrogel articles such as soft contact lenses.

BRIEF SUMMARY OF THE INVENTION

Shaped hydrogel articles such as soft contact lenses are prepared by the steps of:

(1) molding or casting a polymerization mixture comprising:
   (a) a monomer mixture comprising a major proportion of one or more hydrophilic monomers such as 2-hydroxyethyl methacrylate, and one or more cross-linking monomers; and
   (b) an inert, displaceable non-aqueous diluent selected from the group consisting of:
      (i) ethoxylated alkyl glucoside;
      (ii) ethoxylated bisphenol A;
      (iii) polyethylene glycol;
      (iv) mixture of propoxylated and ethoxylated alkyl glucoside;
      (v) single phase mixture of ethoxylated or propoxylated alkyl glucoside and dihydric alcohol of up to 12 carbon atoms;
      (vi) adduct of ε-caprolactone and $C_{2-6}$ alkanediols and triols;
      (vii) ethoxylated $C_{3-6}$ alkanetriol; and
      (viii) mixtures of one or more of (i) through (vii),
   under conditions to polymerize said monomer mixture to produce a shaped gel of a copolymer of said monomers and said diluent; and (2) thereafter replacing said diluent with water.

THE PRIOR ART

In addition to the Larsen and Larsen et al. patents cited above, other relevant prior art includes the following:

Larsen, U.S. Pat. No. 4,565,348;

Ohkada et al., U.S. Pat. No. 4,347,198;

Shepherd, U.S. Pat. No. 4,208,364;

Mueller et al., EP-A-0 493 320 A2; and

Wichterle et al., Re. 27,401 (U.S. Pat. No. 3,220,960).

DETAILED DESCRIPTION OF THE INVENTION

The inert, displaceable, non-aqueous diluents employed in the process of the invention are selected from the following group:

(i) ethoxylated alkyl glucoside;

(ii) ethoxylated bisphenol A;

(iii) polyethylene glycol;

(iv) mixture of propoxylated and ethoxylated alkyl glucoside;

(v) single phase mixture of ethoxylated or propoxylated alkyl glucoside and dihydric alcohol of up to 12 carbon atoms;

(vi) adduct of ε-caprolactone and $C_{2-6}$ alkanediols and triols;

(vii) ethoxylated $C_{3-6}$ alkanetriol; and (viii) mixtures of one or more of (i) through (vii).

The diluents employed are ultimately water-displaceable. That is, the shaped gel of a copolymer of said monomers and said diluent is treated with a solvent to remove the diluent and ultimately replace it with water. In most cases, the solvent used to remove the inert diluent will be water (or an aqueous solution such as physiological saline). However, if desired, and depending on the solubility characteristics of the inert diluent used in the process of the invention, the solvent initially used to replace the inert diluent can be an organic liquid such as ethanol, methanol, acetone, glycerol, mixtures thereof, or the like, or a mixture of one or more such organic liquids with water, followed by extraction with pure water (or physiological saline) to produce a shaped gel comprising a copolymer of said monomers swollen with water.

Ethoxylated and propoxylated alkyl glucosides are compositions of Formula (I):

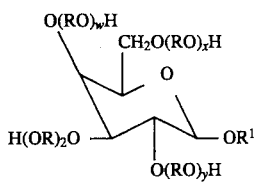

wherein $R^1$ represents a $C_{1-6}$alkyl group (preferably methyl), each R individually represents —$CH_2$—$CH_2$— or —$CH_2$—$CH(CH_3)$—, and the sum of w, x, y, and z is a number within the range of from about 5 to 50 (preferably from 5 to 30), and represents the total number of ethylene or propylene oxide units in the composition. The diluent represented by Formula (I) can be (i) an ethoxylated alkyl glucoside, (ii) a propoxylated alkyl glucoside, (iii) a mixed ethoxylated/propoxylated alkyl glucoside, or mixture of two or three of (i), (ii), and (iii), provided that a major proportion of the R groups in the mixture of compositions represented by Formula (I) represent —$CH_2$—$CH_2$— groups. Ethoxylated and propoxylated alkyl glucosides are commercially available products that are prepared by reacting ethylene oxide or propylene oxide with an alkyl glucoside.

Ethoxylated or propoxylated glucoside can also be employed in a mixture with a dihydric alcohol of up to 12 carbon atoms, and preferably of up to 6 carbon atoms. The mixture of the two materials should be in such proportions that the mixture is single phase. Illustrative dihydric alcohols that can be used include ethylene glycol, propylene glycol, 1,4-butanediol, 1,6-hexanediol, and the like.

Ethoxylated bisphenol A is a compound of Formula (II):

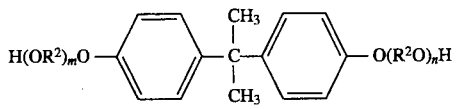

wherein $R^2$ represents —$CH_2$—$CH_2$—, and m+n is a number within the range of from about 2 to about 100 (preferably from about 4 to about 20), and represents the total number of ethylene oxide units in the composition. Ethoxylated bisphenol A is a commercially available product that is prepared by reacting ethylene oxide with bisphenol A.

Polyethylene glycols are compounds that can be represented by Formula (III):

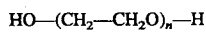

wherein n represents a number such that the molecular weight of the polyethylene glycol is within the range of from about 300 to about 10,000, and preferably from about 400 to 5000. Such polyethylene glycols are commercially available products.

Adducts of ε-caprolactone with $C_{2-6}$alkanediols and triols, are prepared by reacting ε-caprolactone with the $C_{2-6}$alkanediol or triol in the presence of a suitable catalyst. Such adducts having molecular weights within the range of from about 300 to about 500 are preferred for use in the invention. Adducts of ε-caprolactone and alkanediols and triols are commercially available products.

Ethoxylated triols such as ethoxylated trimethylolpropane, ethoxylated glycerol, ethoxylated 1,2,6-hexanetriol, and the like can also be used as the inert diluent. The molecular weights of such materials will usually be within the range of from about 200 to about 1000.

Mixtures of one or more of the above can also be used in the invention. Preferred examples include mixtures of polyethylene glycol and ethoxylated bisphenol A, mixtures of polyethylene glycol and ethoxylated alkyl glucoside, mixtures of ethoxylated and/or propoxylated alkyl glucoside with ethoxylated bisphenol A, and mixtures of ethoxylated alkyl glucoside with ethoxylated triols.

The monomer mixture used in the process of the invention contains a major proportion of a hydrophilic monomer such as 2-hydroxyethyl methacrylate ("HEMA") as the major component, one or more cross-linking monomers, and optionally small amounts of other monomers such as methacrylic acid. HEMA is one preferred hydrophilic monomer. Other hydrophilic monomers that can be employed include 2-hydroxyethyl acrylate, 2-hydroxypropyl methacrylate, 2-hydroxypropyl acrylate, 3-hydroxypropyl methacrylate, N-vinyl pyrrolidone, glycerol mono-methacrylate, glycerol mono-acrylate, and the like.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacroyl chloride, vinylbenzoyl chloride, or the like, to produce a polyethylene polyol having one or more terminal polymerizable olefinic groups bonded to the polyethylene polyol through linking moieties such as carbamate or ester groups. The Examples below include several representative preparations of such "end-capped" polyoxyethylene polyols.

The cross-linking monomers that can be employed, either singly or in combination, include ethylene glycol dimethacrylate ("EGDMA"), trimethylolpropane trimethacrylate ("TMPTMA"), glycerol trimethacrylate, polyethylene glycol dimethacrylate (wherein the polyethylene glycol has a molecular weight up to, e. g., about 5000), and other polyacrylate and polymethacrylate esters, such as the end-capped polyoxyethylene polyols described above containing two or more terminal methacrylate moieties. The cross-linking monomer is used in the usual amounts, e.g., from about 0.000415 to about 0.0156 mol per 100 grams of reactive monomer mixture. The cross-linking monomer can be a hydrophilic monomer.

Other monomers that can be used include methacrylic acid, which is used to influence the amount of water that the hydrogel will absorb at equilibrium. Methacrylic acid is usually employed in amounts of from about 0.2 to about 8 parts, by weight, per 100 parts of hydrophilic monomer. Other monomers that can be present in the polymerization mixture include methoxyethyl methacrylate, acrylic acid, ultra-violet absorbing monomers, and the like.

A polymerization catalyst is included in the monomer mixture. The polymerization catalyst can be a compound such as lauroyl peroxide, benzoyl peroxide, isopropyl percarbonate, azobisisobutyronitrile, or the like, that generates free radicals at moderately elevated temperatures, or the polymerization catalyst can be a photoinitiator system such as an aromatic α-hydroxy ketone or a tertiary amine plus a diketone. Illustrative examples of photoinitiator systems are 2-hydroxy-2-methyl-1-phenyl-propan-1-one and a combination of camphorquinone and ethyl 4-(N,N-dimethylamino)benzoate. The catalyst is used in the polymerization reaction mixture in catalytically effective amounts, e.g., from about 0.1 to about 2 parts by weight per 100 parts of hydrophilic monomer such as HEMA.

The Examples below illustrate the practice of the invention. Some of the materials that are employed in the Examples are identified as follows:

Ethoxylated Bisphenol A (ethoxylated 2,2-bis (4-hydroxyphenyl)propane)—" Photonol 7025" [m+n in Formula (II)=8] and "Photonol 7028" (m+n in Formula (II)=4);

Ethoxylated trimethylolpropane—"Photonol 7158" (m.w.= 730);

4-Methoxyphenol (hydroquinone monomethyl ether)—"MEHQ";

Isocyanatoethyl methacrylate—"IEM";

N,N-dimethylacrylamide—"DMA";

Polyethylene glycol—"PEG nnnn" wherein the "nnnn" refers to the molecular weight;

Ethoxylated (or propoxylated) methyl glucoside—"GLUCAM's E-5, P-10, E-10 and (E-20"—["E-5" signifies a total of 5 ethylene oxide units added to methyl glucoside, "P-10" signifies a total of 10 propylene oxide units added to methyl glucoside, etc.);

Isophoronediisocyanate(5-isocyanato-1-(isocyanatomethyl)-1,3,3,-trimethylcyclohexane)—"IPDI";

Polyethylene glycol nnn boric acid ester—"PEG nnn BAE";

1,4-Butanediol boric acid ester—"1,4-BDBAE";

Hydroxyethyl methacrylate—"HEMA";

Methacrylic acid—"MAA";

Ethylene glycol dimethacrylate—"EGDMA";

Trimethylolpropane trimethacrylate—"TMPTMA";

2-hydroxy-2-methyl-1-phenyl-propan-1-one—"DAROCURE 1173";

Polycaprolactone triol=reaction product (ester) of ε-caprolactone with glycerol, m.w. about 300 —"PCLT300";

1,2,6-trihydroxyhexane—"1,2,6-THH";

Diethylene glycol—"DEG";

Ethylene glycol—"EG";

1,4-Butane diol—"1,4-BuDiol";

1,4-Butane diol/boric acid ester—"1,4-BDBAE"

1,2-Propane diol—"1,2-ProDiol";

Boric acid/glycerol ester—"BAGE"

TEST METHODS

The following test methods are employed in the Examples:

Test Method 1: PhotoDSC Determinations

All photocalorimetric measurements were carried out on a DuPont DSC model 910 unit equipped with an 830 photocalorimeter attachment and Omnitherm software. Sample size was 4.5–6.0 mg in every case. Operating conditions were as follows: temperature 45° C., $N_2$ atmosphere (10 min purge at 40 mL/min prior to irradiation), intensity of the UV lamp source was 2.5–3.0 mW/cm$^2$.

Maximum polymerization rates ($R_p^{max}$) were calculated from the following equation:

$$R_p^{max} = (M)_o/Q_\infty) \, (dQ/dt)_{max} \tag{1}$$

where $Q_\infty$ and $(M)_o$ denote the total heat evolved by the sample and the methacrylate double bond concentration, respectively, and $(dQ/dt)_{max}$ is the maximum rate of heat evolution observed (at $t=T_{max}$) ($T_{max}$=time to peak exotherm, which coincides with the time at which the polymerization reaches its maximum rate of reaction). Note that $Q_\infty$ is obtained from the DSC trace by integrating the area under the exotherm (total heat evolved per sample unit mass, i.e. $Q_m$) and multiplying this quantity by the sample mass. $(M)_o$ is obtained by simply calculating the double bond concentration in the formulation, including diluent. The density of the RMM ("Reactive Monomer Mixture") needs to be determined in order to calculate $(M)_o$ in moles of methacrylate group per unit volume of RMM.

It has been found that $T_{max}$ will normally be within the range of from about 0.2 to about 3.5 minutes, and preferably from about 0.4 to about 2.5 minutes, for those inert, displaceable diluents that can be employed successfully in the particular reactive monomer mixture employed. Therefore, a convenient test to determine whether any proposed inert, displaceable diluent can be employed with any given reactive monomer mixture to produce a shaped gel (any shape will do—it need not be in the shape of a contact lens for the test) of a copolymer of said monomers that is useful for use as a contact lens, is to determine the $T_{max}$ by the PhotoDSC test given above. The useful inert, displaceable diluents for that particular RMM will yield a $T_{max}$ within the ranges given above.

It has also been found that, in most cases, a % conversion of the reactive monomer mix (as determined by dividing the area under the DSC trace up to $T_{max}$ by the total area under the DSC trace), in the Photo DSC test given above, of at least 40% at $T_{max}$, and preferably at least 50%, is required in order to produce an optically clear gel.

Test Method 2: RMM and Diluent Density Measurements

All liquid densities were measured by a method based on Archimedes principle. A Sartorius Research balance fitted with a liquid density kit (available from the manufacturer) was used to carry out all measurements. The method consists in weighing a glass bob in and out of the liquid being tested. The volume of the glass bob is predetermined using a liquid of known density (e.g. water).

The densities of high viscosity liquids (e.g. boric acid esters) were determined with the use of an aluminum pycnometer whose volume had been measured using deionized water at a given temperature.

Test Method 3. Tensile Properties (Modulus, Elongation and Strength)

The lens to be tested is cut to the desired specimen size and shape, and the cross sectional area measured. The sample is then attached into the upper grip of a crosshead movement type of testing instrument equipped with a load cell. The crosshead is lowered to the initial gauge length and the sample specimen attached to the fixed grip. The sample is then elongated at a constant rate of strain and the resulting stress-strain curve is recorded. The elongation is expressed in percent and the tensile modulus and strength is expressed in psi (lbs/in$^2$). It has been found that for a shaped gel to be useful as a contact lens, the modulus of the shaped gel should be at least about 20 psi, and preferably at least about 25 psi.

Test Method 4. Gravimetric Water Content

Samples for gravimetric water content measurements were prepared as follows:
A number of 20 mm diameter×3 mm deep cylindrical polystyrene cavities were hand filled with degassed HEMA-based formulations and cured for approximately 20 minutes under fluorescent tubes in a $N_2$ atmosphere. The total measured energy dose was 1.2–1.6 Joules/cm$^2$. The polymer/diluent disks were demolded from the polystyrene cavities using a hot plate. The disk were then cut with a no.7 cork bore to obtain a 9–10 mm diameter disk. Typically, the polystyrene cavities are filled with sufficient reactive monomer mix to obtain a 1–1.5 mm thick disk. The diluent swollen polymer disks are hydrated in deionized water for 3 hrs at 70° C., and subsequently allowed to remain for an additional 3 days at room temperature. The disks are then removed from the DI (de-ionized) water bath, air dried for 10–15 hrs, and subsequently Vacuum dried (<1.5 mm Hg) at 100° C. for 2 hrs. The weight of each disk is taken, and the disk are then placed in physiological saline for 2 days. The polymer disks are then removed from the saline solution, blotted carefully to remove surface water, and weighed again. The water content is then calculated as follows:

$$\% \ Water = 100 \ (m_{wet} - m_{dry})/m_{wet} \quad (2)$$

Where $m_{dry}$ and $m_{wet}$ denote the weight of the polymer disks before and after hydration, respectively.

Test Method 5. Oxygen Permeability (Dk)

The oxygen permeability was measured by the method of Fatt et al., "Measurement of Oxygen Transmissibility and Permeability of Hydrogel Lenses and Materials", International Contact Lens Clinic, Vol. 9/No.2, March/April 1982, p 76. A polarographic oxygen sensor consisting of a 4 mm diameter gold cathode and a silver-silver chloride ring anode is used in this method. The measured oxygen permeability is denoted by Dk, where D represents the diffusion coefficient for oxygen in the material being tested, and k is the solubility of oxygen in the material. The permeability (Dk) units are (cm$^2$/s)(mL O$_2$/mL·mm Hg).

The following six examples illustrate the preparation of reactive cross-linkers (Examples 1–4), and two prior art diluents (Examples 5 and 6):

EXAMPLE 1

Synthesis of dicapped ethoxylated Bisphenol A (BPA 890)

To a 5 L three neck round bottom flask are added 728 g (1.255 mol) of dried Photonol 7025 (molecular weight=580 g/mol), 1.5 L of dry acetonitrile, 1.0 g of 4-methoxy phenol (MEHQ) and 0.5 g of stannous octoate (approximately 0.1 mol % relative to diol). After these components are added, the resulting solution is purged with dry O$_2$ for 30–45 minutes (a gas diffuser is used for this purpose). After the O$_2$ purge is completed, 365 g (2.35 mol) of isocyanatoethyl methacrylate (IEM) and 730 g of acetonitrile are charged to a 1 L addition funnel (this operation is preferably carried out under N$_2$).
The contents of the addition funnel (i.e. the IEM solution) are then added, dropwise with vigorous stirring, to the 5 L round bottom flask. The addition should take about 2–3 hours to complete. After the IEM addition is complete, the addition funnel is rinsed with 50–100 mL of acetonitrile. The progress of the reaction is followed monitored by following the disappearance of the NCO absorption at 2270 cm$^{-1}$ in the infrared spectra. The acetonitrile is removed under reduced pressure and the resultant viscous liquid dicapped bisphenol A 890 is used as prepared.

EXAMPLE 2

Synthesis of dicapped polyethylene glycol (PEG) 4000

A total of 200 g (0.05 mol) of dry PEG 4000 is placed into a 1 L three neck round bottom flask equipped with mechanical agitation, and a gas-inlet tube. A dry nitrogen blanket is established in the reaction vessel. To this flask is added 375 g of dry acetonitrile and the PEG 4000 is allowed to sit until it has completely dissolved. Subsequently, two drops of stannous octoate and 500 ppm of MEHQ are added. To a 100 mL addition funnel are added 15.52 g (0.100 mol) of IEM and 50 mL of acetonitrile. After the addition of the IEM is completed, the reaction progress is monitored by following the disappearance of the NCO absorption at 2270$^{-1}$ in the infrared spectra. After the reaction is completed, the acetonitrile is removed under reduced pressure and the resultant white waxy dicapped PEG 4000 is used as is.

EXAMPLE 3

Synthesis of dicapped polyethylene glycol (PEG) 4500

A total of 22534 g (0.05 mol) of dry PEG 4500 is placed into a 1 L three neck round bottom flask equipped with mechanical agitation and a gas inlet-tube. The system is flushed successively with dry nitrogen and dry oxygen. To this flask are added 375 g of dry acetonitrile and the PEG 4500 is allowed to sit until it has completely dissolved. Subsequently, 2 drops of stannous octoate and 500 ppm MEHQ are added. To a 100 mL addition funnel are added 15.52 g (0.100 mol) of IEM, and 50 mL of acetonitrile. After addition of the IEM is completed, the reaction progress is monitored by following the disappearance of the NCO absorption at 2270 cm$^{-1}$. After the reaction is completed, the acetonitrile is removed under reduced pressure and the resultant white waxy dicapped PEG 4500 is used as is.

EXAMPLE 4

Synthesis of GLUCAM E-20/polyethylene glycol (PEG) 4500 Derivative

A total of 100 g of dry PEG 4500 (0.022 mol) is placed into a three neck. 1 L round bottom flask equipped with mechanical agitation and a gas-inlet tube. The system is then flushed successively with dry nitrogen and dry oxygen. To this flask is then added 375 g of dry acetonitrile and the PEG 4500 is allowed to sit until it has completely dissolved. Subsequently, 2 drops of stannous octoate and 500 ppm of MEHQ are added. To an addition funnel are added 3.41 g (0.022 mol) of IEM and 10 mL of acetonitrile. After the addition of the IEM is completed, the reaction progress is followed by monitoring the disappearance of the NCO absorption at 2270 cm$^{-1}$ in the infrared spectra. When this peak has completely disappeared, the above reaction mixture is transferred to a 500 mL addition funnel. The contents of the addition funnel are slowly added to a three necked round bottom 2 L flask containing a solution of 200 g of dry acetonitrile and 4.89 g (0.022 mol) of isophorone diisocyanate (IPDI). Provisions should be made for efficient mechanical agitation throughout the addition. After the addition is completed, the reaction is followed by monitoring the disappearance of the PEG hydroxyl peak centered at 3400 cm$^{-1}$ in the infrared spectrum. To the above mixture are then added 6.0 g (0.006 mol) of GLUCAM E-20 in 50 mL of acetonitrile. After the NCO absorption at 2270 cm$^{-1}$ has disappeared, the acetonitrile is removed under reduced pressure and the resultant white powder GLUCAME-20/PEG 4500 solid is used as is.

EXAMPLE 5

Synthesis of PEG 400 Boric Acid Ester Diluent (PEG 400 BAE)

A total of 400 g (1 mol) of polyethylene glycol 400 (PEG 400) is placed into a 2 L rotary evaporator flask. To this flask are added 123.7 g (2.0 mols) of boric acid. The flask is placed on a rotary evaporator and the pressure is slowly reduced to 0.5–1.0 mm Hg. After full vacuum is established, the temperature of the bath is slowly raised to 92° C. Water is recovered from the reaction as the boric acid ester is formed. The clear viscous liquid PEG 400 BAE is used as is. [This diluent is illustrative of the prior art diluents disclosed by Larsen et al., U.S. Pat. Nos. 5,039,459 and 4,889,664.]

EXAMPLE 6

Synthesis of 1,4-Butanediol Boric Acid Ester (1,4-BDBAE)

A total of 277.7 g (4.5 mols) of boric acid was placed into a 3 L rotary evaporator flask. To this flask was added 1,223 g of 1,4-butanediol (13.6 mols). The flask is then placed on a rotary evaporator and the pressure is slowly reduced to 0.5–1.0 mm Hg. After full vacuum is established, the temperature of the bath is slowly raised to 85° C. at approximately 5° C. per 20 minutes. Water is recovered from the reaction as the boric acid ester is formed. The clear viscous liquid 1,4-BDBAE is used as is. (This diluent is illustrative of the prior art diluents disclosed by Larsen et al., U.S. Pat. Nos. 5,039,459 and 4,889,664.)

EXAMPLES 7–35

In these examples, various diluents were employed to prepare soft contact lenses from the following reactive monomer mixture:

A blend is prepared using 96.8% by weight of HEMA, 1.97% methacrylic acid, 0.78% ethylene glycol dimethacrylate (EGDMA), 0.1% of trimethylolpropane trimethacrylate (TMPTMA) and 0.34% of DAROCUR 1173. To this monomer mix is added the inert, displaceable diluent being evaluated. After thoroughly mixing the formulation at ambient temperature, the mixture is allowed to stir under reduced pressure (40 mm Hg) for 30 min (at 25° C.) and subsequently transferred to contact lens molds. The filled molds are exposed to UV light (wavelength=300–380 nm, dose= 1.2–1.6 Joules/cm$_2$) for 20 minutes at approximately 50° C. The molds are then separated, and placed in physiological saline for 3.0 hrs at 70° C. to remove the inert diluent and any residual unreacted monomers. After this initial hydration period the lenses are allowed to equilibrate to room temperature in a fresh bath of physiological saline. The lenses are then tested according to Test Methods 3, 4 and 5.

The Tables below display the diluents evaluated, the monomer/diluent ratios, and the results of the tests made in accordance with Test Methods 3, 4 and 5, for Examples 7–35:

| | Example 7 | Example 8 | Example 9 |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent: | GLUCAM E20 | GLUCAM E10 | GLUCAM E5 |
| Mon./Dil. Ratio | 48:52 | 48:52 | 48:52 |
| Properties: | | | |
| Modulus (psi) | 34 ± 4 | 36 ± 3 | 33 ± 4 |
| % Elongation | 149 ± 50 | 148 ± 63 | 174 ± 46 |
| Tens. Strength (psi) | 40 ± 10 | 40 ± 12 | 46 ± 9 |
| Water Content (%) | 57.4 ± .7 | 54.4 ± .2 | 59.9 ± .3 |
| Hydrogel | Clear | Clear | Clear |
| Kinetic Parameters: | | | |
| Tmax (min) | 1.75 | 1.65 | 1.48 |
| Conv. @ Tmax (%) | 64.5 | 64.7 | 61.4 |

| | Example 10 Control (Prior art) | Example 11 Control (Prior art) | Example 12 |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent: | 1,2,6-THH | Glycerol | Phot 7158 |
| Mon./Dil. Ratio | 48:52 | 48:52 | 48:52 |
| Properties: | | | |
| Modulus (psi) | 25 ± 2 | 40 ± 3 | 27 ± 2 |
| % Elongation | 183 ± 53 | 119 ± 33 | 174 ± 49 |
| Tens. Strength (psi) | 36 ± 80 | 37 ± 72 | 37 ± 7 |
| Water Content (%) | 59.9 ± .1 | 60.6 ± .6 | 59.5 ± .3 |
| Hydrogel | Clear | Clear | Clear |
| Kinetic Parameters: | | | |
| Tmax (min) | 1.80 | 1.53 | 2.15 |
| Conv. @ Tmax (%) | 73.4 | 70.9 | 65.1 |

| | Example 13 | Example 14 | Example 15 |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent: | Phot 7025 | Phot 7028 | PCLT300 |
| Mon./Dil. Ratio | 48:52 | 48:52 | 48:52 |
| Properties: | | | |
| Modulus (psi) | 33 ± 3 | 34 ± 3 | 29 ± 3 |
| % Elongation | 200 ± 76 | 191 ± 48 | 179 ± 55 |
| Tens. Strength (psi) | 48 ± 15 | 47 ± 9 | 40 ± 9 |
| Water Content (%) | 62.2 ± .2 | 59.3 ± .5 | 61.0 ± .6 |
| Hydrogel | Clear | Clear | Clear |
| Kinetic Parameters: | | | |
| Tmax (min) | 1.52 | 1.47 | 1.72 |
| Conv. @ Tmax (%) | 62.2 | 61.2 | 69.0 |

| | Example 16 Control (Prior art) | Example 17 Control (Opaque) | Example 18 Control (Prior art) |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent: | 1,4-BDBAE | GLUCAM P10 | DEG |
| Mon./Dil. Ratio | 48:52 | 48:52 | 48:52 |
| Properties: | | | |
| Modulus (psi) | 27 ± 2 | 16 ± 4 | 14 ± 3 |
| % Elongation | 124 ± 20 | 266 ± 35 | 203 ± 56 |
| Tens. Strength (psi) | 28 ± 35 | 48 ± 12 | 25 ± 4 |
| Water Content (%) | 62.6 ± .6 | 63.5 ± .5 | 65.4 ± .8 |
| Hydrogel | Clear | Opaque | Clear |
| Kinetic Parameters: | | | |
| Tmax (min) | 1.08 | 0.87 | 4.83 |
| Conv. @ Tmax (%) | 59.5 | 31.5 | 83.3 |

| | Example 19 Control (Prior art) | Example 20 Control (Prior art) | Example 21 |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent: | PEG 400BAE | BAGE | PEG 400 |
| Mon./Dil. Ratio | 48:52 | 48:52 | 48:52 |
| Properties: | | | |
| Modulus (psi) | 33 ± 2 | 34 ± 2 | 25 ± 3 |
| % Elongation | 134 ± 29 | 114 ± 42 | 179 ± 35 |
| Tens. Strength (psi) | 35 ± 5 | 34 ± 8 | 19 ± 2 |
| Water Content (%) | 60.4 ± .2 | 62.7 ± .3 | 62.7 ± .8 |
| Hydrogel | Clear | Clear | Clear |
| Kinetic Parameters: | | | |
| Tmax (min) | 0.52 | 1.37 | 3.61 |
| Conv. @ Tmax (%) | 34.8 | 68.8 | 68.9 |

| | Example 22 (Low modulus) | Example 23 Control (Prior art) | Example 24 Control (Prior art) |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent: | 1,4-BuDiol | 1,2-ProDiol | EG |
| Mon./Dil. Ratio | 48:52 | 48:52 | 48:52 |
| Properties: | | | |
| Modulus (psi) | 13 ± 1 | 16 ± 1 | 23 ± 2 |
| % Elongation | 215 ± 66 | 215 ± 53 | 168 ± 30 |
| Tens. Strength (psi) | 23 ± 6 | 28 ± 6 | 27 ± 4 |
| Water Content (%) | 66.4 ± .6 | — | 59.9 ± .2 |
| Hydrogel | Clear | Clear | Clear |
| Kinetic Parameters: | | | |
| Tmax (min) | 3.42 | 5.48 | 4.80 |
| Conv. @ Tmax (%) | 65.4 | 71.5 | 75.0 |

| | Example 25 Control (Opaque) | Example 26 Control (Opaque) | Example 27 Control (Opaque) |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent (%): | | | |
| GLUCAM P-10 | 95 | 85 | 70 |
| GLUCAM E-10 | 5 | 15 | 30 |
| Mon./Dil. Ratio | 48:52 | 48:52 | 48:52 |
| Properties: | | | |
| Modulus (psi) | 12 ± 1 | 17 ± 2 | 21 ± 2 |
| % Elongation | 282 ± 56 | 233 ± 45 | 192 ± 42 |
| Tens. Str. (psi) | 43 ± 9 | 44 ± 8 | 40 ± 11 |
| Water Content (%) | 68.7 ± .4 | 69.8 ± .6 | 68.9 ± .4 |
| Hydrogel | Opaque | Opaque | Opaque |
| Kinetic Parameters: | | | |
| Tmax (min) | 0.85 | 0.98 | 1.14 |
| Conv. @ Tmax (%) | 28.8 | 38.5 | 49.1 |

| | Example 28 | Example 29 |
|---|---|---|
| Composition (%): | | |
| HEMA | 96.8 | 96.8 |
| MAA | 1.97 | 1.97 |
| EGDMA | 0.78 | 0.78 |
| TMPTMA | 0.1 | 0.1 |
| Darocur 1173 | 0.34 | 0.34 |
| Diluent (%): | | |
| GLUCAM P-10 | 40 | 20 |
| GLUCAM E-10 | 60 | 80 |
| Mon./Dil. Ratio | 48:52 | 48:52 |
| Properties: | | |
| Modulus (psi) | 38 ± 3 | 38 ± 4 |
| % Elongation | 162 ± 32 | 199 ± 55 |
| Tens. Strength (psi) | 44 ± 9 | 49 ± 11 |
| Water Content (%) | 59.5 ± .2 | 58.4 ± .5 |
| Hydrogel | Clear | Clear |
| Kinetic Parameters: | | |
| Tmax (min) | 1.47 | 1.56 |
| Conv. @ Tmax (%) | 62.2 | 64.1 |

| | Example 30 Control (Opaque) | Example 31 Control (Opaque) | Example 32 |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTMA | 0.1 | 0.1 | 0.1 |
| Darocur 1173 | 0.34 | 0.34 | 0.34 |
| Diluent (%): | | | |
| GLUCAM P-10 | 95 | 85 | 70 |
| 1,4-BuDiol | 5 | 15 | 30 |
| Mon./Dil. Ratio | 48:52 | 48:52 | 48:52 |
| Properties: | | | |
| Modulus (psi) | 14 ± 1 | 21 ± 3 | 25 ± 4 |
| % Elongation | 209 ± 49 | 194 ± 43 | 175 ± 59 |
| Tens. Str. (psi) | 35 ± 9 | 41 ± 10 | 31 ± 10 |
| Water Content (%) | 69.3 ± .6 | 70.1 ± .3 | 62.2 ± .3 |
| Hydrogel | Opaque | Opaque | Clear |

|  | | | |
|---|---|---|---|
| Kinetic Parameters: | | | |
| Tmax (min) | 0.96 | 1.21 | 2.24 |
| Conv. @ Tmax (%) | 37.5 | 51.6 | 66.2 |

|  | Example 33 (Modulus borderline) | Example 34 (Modulus borderline) | Example 35 (Modulus borderline) |
|---|---|---|---|
| Composition (%): | | | |
| HEMA | 96.8 | 96.8 | 96.8 |
| MAA | 1.97 | 1.97 | 1.97 |
| EGDMA | 0.78 | 0.78 | 0.78 |
| TMPTHA | 0.1 | 0.1 | 0.1 |
| Darocur 1173 | 0.34 | 0.34 | 0.34 |
| Diluent (%): | | | |
| GLUCAM P-10 | 50 | 40 | 20 |
| 1,4-BuDiol | 50 | 60 | 80 |
| Mon./Dil. Ratio | 48:52 | 48:52 | 48:52 |
| Properties: | | | |
| Modulus (psi) | 20 ± 3 | 21 ± 2 | 19 ± 1 |
| % Elongation | 160 ± 41 | 201 ± 63 | 258 ± 80 |
| Tens. Str. (psi) | 23 ± 7 | 31 ± 60 | 36 ± 90 |
| Water Content (%) | 62.2 ± .3 | 62.4 ± .4 | 62.9 ± .1 |
| Hydrogel | Clear | Clear | Clear |
| Kinetic Parameters: | | | |
| Tmax (min) | 2.81 | 3.23 | 3.43 |
| Conv. @ Tmax (%) | 69.4 | 68.9 | 60.2 |

EXAMPLES 36–39

In these examples, Photonol 7025 was employed as the diluent in conjunction with a reactive monomer mix containing HEMA, the reactive cross-linker of Example 4, and Darocur 1173, in various proportions. The following is an illustrative preparation: A monomer mixture containing of 25% by weight of the PEG 4500-GLUCAM E-20 derivative described in Example 4, 0.35% DAROCUR 1173, and 74.7% of HEMA was mixed With Photonol 7025, an inert, displaceable diluent in such-amounts as to make up a 48% monomer, 52% diluent blend. After thoroughly mixing the above formulation at 65° C., the mixture is allowed to stir under reduced pressure (40 mm Hg) for 30 min (at 65° C.) and subsequently transferred to contact lens molds. The filled molds are exposed to UV light (wavelength =300–380 nm, dose=1.2–1.6 Joules/cm$_2$) for 20 minutes at approximately 65° C. The molds are then separated, and placed in physiological saline for 3.0 hrs at 70° C. to remove the inert diluent and any residual unreacted monomers. After this initial hydration period the lenses are allowed to equilibrate to room temperature in a fresh bath of physiological saline. The lenses are then tested according to Test Methods 3, 4 and 5.

The following table displays the proportions used in the reactive monomer mixtures and the results of the tests made in accordance with Test Methods 3, 4 and 5 for Examples 36–39:

|  | Example 36 (Modulus borderline) | Example 37 (Modulus borderline) | Example 38 (Modulus borderline) | Example 39 (Modulus borderline) |
|---|---|---|---|---|
| Composition (%) | | | | |
| HEMA | 74.7 | 64.7 | 49.7 | 39.7 |
| PEG4500-GLUE20 | 25 | 35 | 50 | 60 |
| Darocur 1173 | 0.35 | 0.35 | 0.35 | 0.35 |
| Diluent: | Pho 7025 | Pho 7025 | Pho 7025 | Pho 7025 |
| Mon./Dil. Ratio | 48:52 | 48:52 | 48:52 | 48:52 |
| Properties: | | | | |
| Modulus (psi) | 22 ± 1 | 19 ± 1 | 22 ± 8 | 20 ± 3 |
| % Elongation | 266 ± 42 | 218 ± 44 | 180 ± 76 | 160 ± 41 |
| Tens. Str. (psi) | 35 ± 5 | 30 ± 5 | 15 ± 2 | 23 ± 7 |
| Water Content (%) | 55 ± 2 | 69 ± 1 | 70 ± 1 | 80 ± 2 |
| Hydrogel | Clear | Clear | Clear | Clear |
| Dk | 31.5 | 40.3 | 60.5 | 41.3 |

EXAMPLES 40–44

In these examples, Photonol 7025 was used as the diluent in conjunction with a reactive monomer mixture of HEMA, MAA, PEG 4500XL (Example 3), BPA890XL (Example 1), and Darocur 1173, in various proportions. The following is an illustrative preparation:

A reactive monomer blend made up of 5.78% by weight of the PEG 4500 cross-linker described in Example 3, 11.1% of the ethoxylated bisphenol A cross-linker described in Example 1, 0.34% DAROCUR 1173, 1.98% methacrylic acid, and 80.8% HEMA was mixed with enough Photonol 7025 to make up a 48% monomer mix and 52% diluent. After thoroughly mixing the above blend at 65° C., the mixture is allowed to stir under reduced pressure (40 mm Hg) for 30 min (at 65° C.) and subsequently transferred to contact lens molds. The filled molds are exposed to UV light (wavelength=300–380 nm, dose=1.2–1.6 Joules/cm$_2$) for 20 minutes at approximately 65° C. The molds are then separated, and placed in physiological saline for 3.0 hrs at 70° C. to remove the inert diluent and any residual unreacted monomers. After this initial hydration period the lenses are allowed to equilibrate to room temperature in a fresh bath of physiological saline. The lenses are then tested according to Test Methods 3, 4 and 5.

The following table displays the proportions of the monomers and the results of the tests made in accordance with Test Methods 3, 4 and 5 for Examples 40–44:

|  | Example 40 | Example 41 | Example 42 |
|---|---|---|---|
| Composition (%): | | | |
| HEMA | 80.8 | 75.3 | 64.5 |
| MAA | 1.98 | 1.98 | 1.98 |
| PEG 4500XL | 5.78 | 11.1 | 22.1 |
| BPA890XL | 11.1 | 11.1 | 11.1 |
| Darocur 1173 | 0.34 | 0.34 | 0.34 |
| Diluent: | Phot 7025 | Phot 7025 | Phot 7025 |
| Mon./Dil. Ratio | 48:52 | 48:52 | 48:52 |
| Properties: | | | |
| Modulus (psi) | 68 ± 6 | 84 ± 9 | 80 ± 9 |
| % Elongation | 57 ± 16 | 59 ± 13 | 90 ± 27 |
| Tens. Strength (psi) | 48 ± 12 | 51 ± 9 | 76 ± 19 |
| Water Content (%) | 36 ± 1 | 41 ± 1 | 52 ± 1 |
| Hydrogel | Clear | Clear | Clear |
| Dk | 20.5 | 23.0 | 28.8 |

|  | Example 43 | Example 44 |
|---|---|---|
| Composition (%): | | |
| HEMA | 53.9 | 41.9 |

|  |  |  |
|---|---|---|
| MAA | 1.98 | 1.98 |
| PEG 4500XL | 32.7 | 44.7 |
| BPA890XL | 11.1 | 11.1 |
| Darocur 1173 | 0.34 | 0.34 |
| Diluent: | Phot 7025 | Phot 7025 |
| Mon./Dil. Ratio | 48:52 | 48:52 |
| Properties: |  |  |
| Modulus (psi) | 84 ± 8 | 81 ± 9 |
| % Elongation | 84 ± 22 | 80 ± 32 |
| Tens. Strength (psi) | 73 ± 16 | 78 ± 34 |
| Water Content (%) | 59 ± 1 | 63 ± 1 |
| Hydrogel | Clear | Clear |
| Dk | 35.7 | 39.7 |

EXAMPLES 45–59

In these examples, Photonol 7025 was used as the diluent in conjunction with a reactive monomer mixture of HEMA, MAA, PEG 4000XL (Example 2), diglycidyl bisphenol A dimethacrylate (Example 1), and Darocur 1173, in various proportions. The following is an illustrative preparation:

A reactive monomer blend made up of 90.6% by weight of HEMA, 1.98% by weight of MAA, 5% by weight of the PEG 4000XL cross-linker described in Example 2, 2.04% by weight of the diglycidyl bisphenol A dimethacrylate cross-linker of Example 1, and 0.34% DAROCUR 1173, was mixed with enough Photonol 7025 to make up a 48% monomer mix and 52% diluent. After thoroughly mixing the above blend at 65° C., the mixture is allowed to stir under reduced pressure (40 mm Hg) for 30 min (at 65° C.) and subsequently transferred to contact lens molds. The filled molds are exposed to UV light (wavelength=300–380 nm, dose=1.2–1.6 Joules/cm$_2$) for 20 minutes at approximately 65° C. The molds are then separated, and placed in physiological saline for 3.0 hrs at 70° C. to remove the inert diluent and any residual unreacted monomers. After this initial hydration period the lenses are allowed to equilibrate to room temperature in a fresh bath of physiological saline. The lenses are then tested according to Test Methods 3, 4 and 5.

The following tables display the proportions of the monomers and the results of the tests made in accordance with Test Methods 3, 4 and 5 for Examples 45–59:

|  | Example 45 | Example 46 | Example 47 | Example 48 |
|---|---|---|---|---|
| Composition (%): |  |  |  |  |
| HEMA | 90.6 | 85.6 | 75.6 | 65.6 |
| MAA | 1.98 | 1.98 | 1.98 | 1.98 |
| PEG 4000XL | 5 | 10 | 20 | 30 |
| DGBPA510 | 2.04 | 2.04 | 2.04 | 2.04 |
| Darocur 1173 | 0.34 | 0.34 | 0.34 | 0.34 |
| Diluent: | Phot 7025 | Phot 7025 | Phot 7025 | Phot 7025 |
| Mon./Dil. Ratio | 48:52 | 48:52 | 48:52 | 48:52 |
| Properties: |  |  |  |  |
| Modulus (psi) | 43 ± 3 | 44 ± 3 | 50 ± 2 | 49 ± 6 |
| % Elongation | 133 ± 35 | 148 ± 34 | 135 ± 35 | 139 ± 38 |
| Tens. Strength (psi) | 44 ± 11 | 46 ± 10 | 49 ± 9 | 53 ± 13 |
| Water Content (%) | 42 ± 1 | 45 ± 1 | 52 ± 1 | 56 ± 1 |
| Hydrogel | Clear | Clear | Clear | Clear |
| Dk | 30.3 | 33.6 | 39.4 | 42.7 |
| Kinetic Parameters: |  |  |  |  |
| Tmax (min) | 1.52 | 1.19 | 1.26 | — |
| Conv. @ Tmax (%) | 53.8 | 59.3 | 49.2 | — |

|  | Example 49 | Example 50 | Example 51 | Example 52 |
|---|---|---|---|---|
| Composition (%): |  |  |  |  |
| HEMA | 55.6 | 89.2 | 84.2 | 73.8 |
| MAA | 1.98 | 1.98 | 1.98 | 1.98 |
| PEG 4000XL | 40 | 5 | 10 | 20 |
| DGBPA510 | 2.04 | 3.84 | 2.04 | 2.04 |
| Darocur 1173 | 0.34 | 0.34 | 0.34 | 0.34 |
| Diluent: | Phot 7025 | Phot 7025 | Phot 7025 | Phot 7025 |
| Mon./Dil. Ratio | 48:52 | 48:52 | 48:52 | 48:52 |
| Properties: |  |  |  |  |
| Modulus (psi) | 47 ± 7 | 60 ± 4 | 60 ± 5 | 62 ± 3 |
| % Elongation | 118 ± 33 | 94 ± 29 | 126 ± 25 | 129 ± 33 |
| Tens. Strength (psi) | 44 ± 12 | 48 ± 11 | 64 ± 15 | 64 ± 15 |
| Water Content (%) | 61 ± 1 | 37 ± 1 | 40 ± 1 | 47 ± 1 |
| Hydrogel | Clear | Clear | Clear | Clear |
| Dk | 49.5 | 25.4 | 27.6 | 35.1 |

|  | Example 53 | Example 54 | Example 55 | Example 56 |
|---|---|---|---|---|
| Composition (%): |  |  |  |  |
| HEMA | 63.8 | 53.8 | 91.6 | 86.6 |
| MAA | 1.98 | 1.98 | 0.98 | 0.98 |
| PEG 4000XL | 30 | 40 | 5 | 10 |
| DGBPA510 | 2.04 | 2.04 | 2.04 | 2.04 |
| Darocur 1173 | 0.34 | 0.34 | 0.34 | 0.34 |
| Diluent: | Phot 7025 | Phot 7025 | Phot 7025 | Phot 7025 |
| Mon./Dil. Ratio | 48:52 | 48:52 | 48:52 | 48:52 |
| Properties: |  |  |  |  |
| Modulus (psi) | 60 ± 4 | 52 ± 11 | 43 ± 3 | 49 ± 5 |
| % Elongation | 109 ± 41 | 108 ± 27 | 124 ± 37 | 131 ± 37 |
| Tens. Strength (psi) | 50 ± 15 | 52 ± 13 | 42 ± 9 | 48 ± 10 |
| Water Content (%) | 54 ± 2 | 57 ± 1 | 48 ± 1 | 52 ± 1 |
| Hydrogel | Clear | Clear | Clear | Clear |
| Dk | 41.4 | 46.3 | 20.8 | 48.10 |
| Kinetic Parameters: |  |  |  |  |
| Tmax (min) | — | — | 1.18 | 1.13 |
| Conv. @ Tmax (%) | — | — | 62.0 | 60.0 |

|  | Example 57 | Example 58 | Example 59 |
|---|---|---|---|
| Composition (%): |  |  |  |
| HEMA | 76.6 | 66.6 | 56.6 |
| MAA | 0.98 | 0.98 | 0.98 |
| PEG 4000XL | 30 | 30 | 40 |
| DGBPA510 | 2.04 | 2.04 | 2.04 |
| Darocur 1173 | 0.34 | 0.34 | 0.34 |
| Diluent: | Phot 7025 | Phot 7025 | Phot 7025 |
| Mon./Dil. Ratio | 48:52 | 48:52 | 48:52 |
| Properties: |  |  |  |
| Modulus (psi) | 49 ± 3 | 48 ± 5 | 46 ± 2 |
| % Elongation | 141 ± 35 | 123 ± 43 | 130 ± 51 |
| Tens. Strength (psi) | 53 ± 10 | 49 ± 14 | 52 ± 18 |
| Water Content (%) | 60 ± 1 | 65 ± 1 | 70 ± 1 |
| Hydrogel | Clear | Clear | Clear |
| Dk | 31.1 | 40.2 | 44.0 |
| Kinetic Parameters: |  |  |  |
| Tmax (min) | 0.89 | 0.82 | 0.68 |
| Conv. @ Tmax (%) | 53.4 | 52.7 | 46.4 |

EXAMPLES 60–69

In these examples, GLUCAM E20 was used as the diluent in conjunction with a reactive monomer mixture of HEMA, MAA, PEG 4500XL (Example 3), diglycidyl bisphenol A dimethacrylate (Example 1), and Darocur 1173, in various proportions. The following is an illustrative preparation:

A reactive monomer blend made up of 5.7% by weight of the PEG 4500 cross-linker described in Example 3, 4.98% of the ethoxylated bisphenol A described in Example 1, 0.35% DAROCUR 1173, 1.98% methacrylic acid, and 87.0% HEMA was mixed with enough GLUCAM E-20 to make up a 48% monomer mix and 52% diluent. After thoroughly mixing the above blend at 65° C., the mixture is allowed to stir under reduced pressure (40 mm Hg) for 30 min (at 65° C.) and subsequently transferred to contact lens molds. The filled molds are exposed to UV light (wavelength=300–380 nm, dose=1.2–1.6 Joules/cm$_2$) for 20 minutes at approximately 65° C. The molds are then separated, and placed in physiological saline for 3.0 hrs at 70° C. to remove the inert diluent and any residual unreacted monomers. After this initial hydration period the lenses are allowed to equilibrate to room temperature in a fresh bath of physiological saline. The lenses are then tested according to Test Methods 3, 4 and 5.

The following tables display the proportions of the monomers and the results of the tests made in accordance with Test Methods 3, 4 and 5 for Examples 60–69:

|  | Example 60 | Example 61 | Example 62 | Example 63 | Example 64 |
|---|---|---|---|---|---|
| Composition (%): | | | | | |
| HEMA | 87.0 | 81.8 | 73.7 | 59.4 | 48.5 |
| MAA | 1.98 | 1.98 | 1.98 | 1.98 | 1.98 |
| PEG 4500XL | 5.7 | 10.9 | 19 | 33.3 | 44.2 |
| BPA890XL | 4.98 | 4.98 | 4.98 | 4.98 | 4.98 |
| Darocur 1173 | 0.35 | 0.35 | 0.35 | 0.35 | 0.35 |
| Diluent: | GLUCAM E20 | GLUCAM E20 | GLUCAM E20 | GLUCAM E20 | GLUCAM E20 |
| Mon./Dil. Ratio | 48:52 | 48:52 | 48:52 | 48:52 | 48:52 |
| Properties: | | | | | |
| Modulus (psi) | 63 ± 7 | 63 ± 5 | 66 ± 4 | 70 ± 5 | 80 ± 12 |
| % Elongation | 119 ± 23 | 120 ± 33 | 142 ± 35 | 145 ± 34 | 159 ± 36 |
| Tens. Strength (psi) | 33 ± 12 | 34 ± 14 | 46 ± 18 | 51 ± 19 | 68 ± 24 |
| Water Content (%) | 56 ± 1 | 58 ± 1 | 62 ± 1 | 68 ± 1 | 71 ± 1 |
| Hydrogel | Clear | Clear | Clear | Clear | Clear |
| Dk | 25.9 | 27.7 | 32.3 | 38.7 | 45.0 |

|  | Example 65 | Example 66 | Example 67 | Example 68 | Example 69 |
|---|---|---|---|---|---|
| Composition (%): | | | | | |
| HEMA | 83.1 | 77.9 | 69.8 | 55.5 | 44.6 |
| MAA | 1.98 | 1.98 | 1.98 | 1.98 | 1.98 |
| PEG 4500XL | 5.7 | 10.9 | 19 | 33.3 | 44.2 |
| BPA890XL | 8.9 | 8.9 | 8.9 | 8.9 | 8.9 |
| Darocur 1173 | 0.35 | 0.35 | 0.35 | 0.35 | 0.35 |
| Diluent: | GLUCAM E20 | GLUCAM E20 | GLUCAM E20 | GLUCAM E20 | GLUCAM E20 |
| Mon./Dil. Ratio | 48:52 | 48:52 | 48:52 | 48:52 | 48:52 |
| Properties: | | | | | |
| Modulus (psi) | 86 ± 8 | 89 ± 4 | 89 ± 5 | 96 ± 6 | 102 ± 6 |
| % Elongation | 114 ± 14 | 120 ± 30 | 127 ± 35 | 163 ± 25 | 162 ± 25 |
| Tens. Strength (psi) | 40 ± 15 | 43 ± 19 | 49 ± 25 | 82 ± 21 | 87 ± 15 |
| Water Content (%) | 53 ± 1 | 55 ± 1 | 60 ± 1 | 65 ± 1 | 69 ± 2 |
| Hydrogel | Clear | Clear | Clear | Clear | Clear |
| Dk | 21.0 | 23.4 | 29.2 | 34.5 | 40.3 |

EXAMPLE 70

(Synthesis of Monocapped Polyethylene Glycol 3350)

"PEG 3350MC"

A total of 200 g (0.060 mol) of dry PEG 3350 is placed into a three neck flask equipped with mechanical agitation, and a gas inlet tube. The system is flushed with dry nitrogen and subsequently, dry oxygen. To the PEG 3350 are added 600 g of dry acetonitrile and allowed to mix until all of the PEG 3350 has completely dissolved. Subsequently, 2 drops of stannous octoate and 500 ppm of MEHQ are added. Via a dropping funnel are added 8.69 g (0.056 mol) of isocyanatoethyl methacrylate. The reaction is allowed to proceed at room temperature for 24–28 hours. The progress of the reaction is followed by the disappearance of the NCO absorption at 2270 cm$^{-1}$ in the infrared spectra. The acetonitrile is then removed under reduced pressure and the white waxy monocapped PEG 3350 is used as is.

EXAMPLES 71–107

In these examples, various diluents and diluent mixtures were used in conjunction with a reactive monomer mixture of HEMA, DMA, PEG 4000XL (Example 2), diglycidyl bisphenol A dimethacrylate (Example 1), PEG 3350MC (Example 70), and Darocur 1173. The following is an illustrative preparation:

A reactive monomer blend was prepared using 64.7% by weight HEMA, 20.0% N,N-dimethyl acrylamide (DMA), the dicapped PEG 4000 crosslinker described in Example 2, 2.0% of the ethoxylated bisphenol A cross-linker described in Example 1, 6.0% of the monocapped PEG 3350 described in Example 70, and 0.34% of Darocur 1173. To 60% by weight of this monomer blend was added 40% of PEG 1000 as an inert, displaceable diluent. After thoroughly mixing the above blend at 60° C., the mixture is allowed to stir under reduced pressure (40 mm Hg) for 30 min (at 60° C.) and subsequently transferred to contact lens molds. The filled molds are exposed to UV light (wavelength=300–380 nm, dose=1.2–1.6 Joules/$cm_2$) for 20 minutes at approximately 60° C. The molds are then separated, and placed in physiological saline for 3.0 hrs at 70° C. to remove the inert diluent and any residual unreacted monomers. After this initial hydration period the lenses are allowed to equilibrate to room temperature in a fresh bath of physiological saline. The lenses are then tested according to Test Methods 3, 4 and 5.

The following tables display the proportions of the monomers and the results of the tests made in accordance with Test Methods 3, 4 and 5 for Examples 71–107:

| | Example 71 | Example 72 | Example 73 (Modulus borderline) | Example 74 (Modulus borderline) | Example 75 Control (Prior Art) | Example 76 | Example 77 | Example 78 |
|---|---|---|---|---|---|---|---|---|
| Composition (%): | | | | | | | | |
| HEMA | 64.7 | 64.7 | 64.7 | 64.7 | 64.7 | 64.7 | 64.7 | 64.7 |
| DMA | 20 | 20 | 20 | 20 | 20 | 20 | 20 | 20 |
| PEG 4000XL | 7 | 7 | 7 | 7 | 7 | 7 | 7 | 7 |
| PEG 3350MC | 6 | 6 | 6 | 6 | 6 | 6 | 6 | 6 |
| BPA890XL | 2 | 2 | 2 | 2 | 2 | 2 | 2 | 2 |
| Darocur 1173 | 0.34 | 0.34 | 0.34 | 0.34 | 0.34 | 0.34 | 0.34 | 0.34 |
| Diluent: | PEG 1000 | PEG 750 | PEG 600 | PEG 400 | PEG 400BAE | GLUCAM E10 | GLUCAM E20 | Phot 7025 |
| Mon./Dil. Ratio | 60:40 | 60:40 | 60:40 | 60:40 | 60:40 | 60:40 | 60:40 | 60:40 |
| Properties: | | | | | | | | |
| Modulus (psi) | 25 | 22 | 19 | 18 | 51 | 53 | 51 | 50 |
| % Elongation | 191 | 200 | 191 | 189 | 122 | 135 | 133 | 165 |
| Tens. Strength (psi) | 27 | 21 | 24 | 26 | 46 | 47 | 44 | 49 |
| Water Content (%) | 63.0 | 61.7 | 61.3 | 62.1 | 61.3 | 60.8 | 60.5 | 61.1 |
| Hydrogel | Clear | Clear | Clear | Clear | Clear | Clear | Clear | Clear |
| Kinetic Parameters: | | | | | | | | |
| Tmax (min) | 3.50 | 3.90 | 4.00 | 4.30 | 0.34 | 1.10 | 0.90 | 1.10 |
| Conv. at Tmax (%) | 59.0 | 58.0 | 61.0 | 63.0 | 39.0 | 42.0 | 44.0 | 39.0 |

| | Example 79 | Example 80 | Example 81 | Example 82 | Example 83 | Example 84 | Example 85 |
|---|---|---|---|---|---|---|---|
| Composition (%): | | | | | | | |
| HEMA | 64.7 | 64.7 | 64.7 | 64.7 | 64.7 | 64.7 | 64.7 |
| DMA | 20 | 20 | 20 | 20 | 20 | 20 | 20 |
| PEG 4000XL | 7 | 7 | 7 | 7 | 7 | 7 | 7 |
| BPA890 | 2 | 2 | 2 | 2 | 2 | 2 | 2 |
| PEG 3350MC | 6 | 6 | 6 | 6 | 6 | 6 | 6 |
| Darocur 1173 | 0.34 | 0.34 | 0.34 | 0.34 | 0.34 | 0.34 | 0.34 |
| Diluent (%): | | | | | | | |
| PEG 400 | 90 | 75 | 60 | 50 | 35 | 25 | 15 |
| Photonol 7025 | 10 | 25 | 40 | 50 | 65 | 75 | 85 |
| Mon./Dil. Ratio | 60:40 | 60:40 | 60:40 | 60:40 | 60:40 | 60:40 | 60:40 |
| Properties: | | | | | | | |
| Modulus (psi) | 27 | 31 | 30 | 39 | 42 | 51 | 52 |
| % Elongation | 200 | 210 | 190 | 186 | 175 | 185 | 160 |
| Tens. Strength (psi) | 28 | 31 | 29 | 35 | 40 | 40 | 43 |
| Water Content (%) | 62.1 | 61.9 | 62.0 | 61.2 | 61.1 | 60.9 | 60.7 |
| Hydrogel | Clear | Clear | Clear | Clear | Clear | Clear | Clear |
| Kinetic Parameters: | | | | | | | |
| Tmax (min) | 4.2 | 4.0 | 3.9 | 3.4 | 2.1 | 1.6 | 1.2 |
| Conv. @ Tmax (%) | 59.0 | 56.0 | 52 | 53 | 51.0 | 48.0 | 41.0 |

-continued

|  | Example 86 | Example 87 | Example 88 | Example 89 | Example 90 | Example 91 | Example 92 |
|---|---|---|---|---|---|---|---|
| Composition (%): | | | | | | | |
| HEMA | 64.7 | 64.7 | 64.7 | 64.7 | 64.7 | 64.7 | 64.7 |
| DMA | 20 | 20 | 20 | 20 | 20 | 20 | 20 |
| PEG 4000XL | 7 | 7 | 7 | 7 | 7 | 7 | 7 |
| BPA890 | 2 | 2 | 2 | 2 | 2 | 2 | 2 |
| PEG 3350MC | 6 | 6 | 6 | 6 | 6 | 6 | 6 |
| Darocur 1173 | 0.34 | 0.34 | 0.34 | 0.34 | 0.34 | 0.34 | 0.34 |
| Diluent (%): | | | | | | | |
| PEG 400 | 90 | 75 | 60 | 50 | 90 | 75 | 60 |
| GLUCAM E20 | 10 | 25 | 40 | 50 | 10 | 25 | 40 |
| Mon./Dil. Ratio | 60:40 | 60:40 | 60:40 | 60:40 | 60:40 | 60:40 | 60:40 |
| Properties: | | | | | | | |
| Modulus (psi) | 24 | 29 | 30 | 37 | 44 | 48 | 52 |
| % Elongation | 185 | 190 | 188 | 178 | 150 | 150 | 141 |
| Tens. Strength (psi) | 25 | 29 | 31 | 34 | 41 | 39 | 45 |
| Water Content (%) | 61.8 | 61.7 | 61.2 | 61.0 | 60.8 | 60.7 | 60.5 |
| Hydrogel | Clear | Clear | Clear | Clear | Clear | Clear | Clear |
| Kinetic Parameters: | | | | | | | |
| Tmax (min) | 4.1 | 3.7 | 3.2 | 2.1 | 1.4 | 1.0 | 0.9 |
| Conv. @ Tmax (%) | 59.0 | 50.0 | 49.0 | 46.0 | 48.0 | 44.0 | 47.0 |

|  | Example 93 | Example 94 (Modulus borderline) | Example 95 | Example 96 | Example 97 | Example 98 | Example 99 | Examp.100 |
|---|---|---|---|---|---|---|---|---|
| Composition (%): | | | | | | | | |
| HEMA | 64.7 | 64.7 | 64.7 | 64.7 | 64.7 | 64.7 | 64.7 | 64.7 |
| DMA | 20 | 20 | 20 | 20 | 20 | 20 | 20 | 20 |
| PEG 4000XL | 7 | 7 | 7 | 7 | 7 | 7 | 7 | 7 |
| BPA890 | 2 | 2 | 2 | 2 | 2 | 2 | 2 | 2 |
| PEG 3350MC | 6 | 6 | 6 | 6 | 6 | 6 | 6 | 6 |
| Darocur 1173 | 0.34 | 0.34 | 0.34 | 0.34 | 0.34 | 0.34 | 0.34 | 0.34 |
| Diluent (%): | | | | | | | | |
| PEG 1000 | 100 | 90 | 75 | 60 | 50 | 35 | 25 | 15 |
| GLUCAM E20 | 0 | 10 | 25 | 40 | 50 | 65 | 75 | 85 |
| Mon./Dil. Ratio | 60:40 | 60:40 | 60:40 | 60:40 | 60:40 | 60:40 | 60:40 | 60:40 |
| Properties: | | | | | | | | |
| Modulus (psi) | 25 | 21 | 28 | 33 | 34 | 33 | 47 | 49 |
| % Elongation | 191 | 190 | 175 | 184 | 141 | 132 | 122 | 111 |
| Tens. Strength (psi) | 27 | 30 | 37 | 31 | 42 | 41 | 49 | 41 |
| Water Content (%) | 63.0 | 62.3 | 62.0 | 61.6 | 61.0 | 61.3 | 60.8 | 61.0 |
| Hydrogel | Clear | Clear | Clear | Clear | Clear | Clear | Clear | Clear |
| Kinetic Parameters: | | | | | | | | |
| Tmax (min) | 3.5 | 3.3 | 2.9 | 2.6 | 2.1 | 1.4 | 1.1 | 1.1 |
| Conv. @ Tmax (%) | 59.0 | 55.0 | 53.0 | 54.0 | 49.0 | 47.0 | 46.0 | 41.0 |

|  | Examp. 101 (Modulus borderline) | Examp. 102 | Examp. 103 | Examp. 104 | Examp. 105 | Examp. 106 | Examp. 107 |
|---|---|---|---|---|---|---|---|
| Composition (%): | | | | | | | |
| HEMA | 64.7 | 64.7 | 64.7 | 64.7 | 64.7 | 64.7 | 64.7 |
| DMA | 20 | 20 | 20 | 20 | 20 | 20 | 20 |
| PEG 4000XL | 7 | 7 | 7 | 7 | 7 | 7 | 7 |
| BPA890 | 2 | 2 | 2 | 2 | 2 | 2 | 2 |
| PEG 3350MC | 6 | 6 | 6 | 6 | 6 | 6 | 6 |
| Darocur 1173 | 0.34 | 0.34 | 0.34 | 0.34 | 0.34 | 0.34 | 0.34 |
| Diluent (%): | | | | | | | |
| PEG 1000 | 90 | 75 | 60 | 50 | 90 | 75 | 60 |
| Photonol 7025 | 10 | 25 | 40 | 50 | 10 | 25 | 40 |
| Mon./Dil. Ratio | 60:40 | 60:40 | 60:40 | 60:40 | 60:40 | 60:40 | 60:40 |
| Properties: | | | | | | | |
| Modulus (psi) | 19 | 27 | 32 | 35 | 39 | 45 | 46 |
| % Elongation | 183 | 175 | 181 | 177 | 131 | 125 | 130 |
| Tens. Strength (psi) | 36 | 28 | 31 | 33 | 41 | 41 | 47 |

-continued

|  |  |  |  |  |  |  |  |
|---|---|---|---|---|---|---|---|
| Water Content (%) | 61.1 | 62.8 | 62.5 | 62.1 | 61.5 | 60.7 | 60.8 |
| Hydrogel | Clear | Clear | Clear | Clear | Clear | Clear | Clear |
| Kinetic Parameters: |  |  |  |  |  |  |  |
| Tmax (min) | 3.6 | 3.4 | 3.1 | 2.7 | 1.4 | 1.1 | 1.1 |
| Conv. @ Tmax (%) | 49.0 | 51.0 | 45.0 | 39.0 | 41.0 | 42.0 | 44.0 |

EXAMPLE 108

Synthesis of Isocyanatoethyl Methacrylate Capped PEG 2000 Monomethyl Ether

A total of 200 g (0.10 mol) of dry PEG 2000 monomethyl ether is charged into a 1 L three neck flask equipped with a mechanical stirrer and a gas inlet tube. A total of 600 g of dry acetonitrile is added to the flask, and the monomethoxy PEG 2000 allowed to dissolve completely. The system is then flushed with dry nitrogen and then dry oxygen. Subsequently, two drops of stannous octoate and 500 ppm of 4-methoxy hydroquinone (MEHQ) is added to the flask. Using a dropping funnel 15.51 g (0.10 mol) of isocyanatoethyl methacrylate in 50 g of acetonitrile are added dropwise to the contents of the 1 L flask. The reaction is allowed to proceed at room temperature for 24–28 hrs. The progress of the reaction is followed by monitoring the disappearance of the NCO absorption at 2270 cm$^{-1}$ in the infrared spectrum. After the reaction is deemed complete (no absorption at 2270$^{-1}$), the solvent is removed under reduced pressure and the white, waxy monocapped monomethoxy PEG 2000 is used as is.

EXAMPLES 109–120

A reactive monomer blend was prepared using various amounts of HEMA, 20.0% N,N-dimethyl acrylamide (DMA), 16.0% of the dicapped PEG 4500 crosslinker described in Example 3 (PEG 4500XL), 8.0% of the ethoxylated bisphenol A crosslinker described in Example 1 (BPA890), various amounts of the monocapped monomethoxy PEG 2000 described in Example 108 (MC mPEG 2000), and 0.4% of Darocur 1173. To 55% by weight of this monomer blend was added 45% of an inert, displaceable diluent made up of 50% GLUCAM E-20 and 50% Photonol 7025. After thoroughly mixing the above blend at 60° C., the mixture is allowed to stir under reduced pressure (40 mm Hg) for 30 min (at 60° C.) and subsequently transferred to contact lens molds. The filled molds are exposed to UV light (wavelength=300–380 nm, dose =1.2–1.6 Joules/cm$_2$) for 20 minutes at approximately 60° C. The molds are then separated, and placed in physiological saline for 3.0 hrs at 70° C. to remove the inert diluent and any residual, unreacted monomers. After this initial hydration period the lenses are allowed to equilibrate to room temperature in a fresh bath of physiological saline. The lenses are then tested according to Test Methods 3, 4 and 5.

The reactive monomer mixture formulations and the results of the tests of the lenses prepared in accordance with Examples 109–120 are shown in the following tables:

|  | Examp. 109 | Examp. 110 | Examp. 111 | Examp. 112 | Examp. 113 | Examp. 114 |
|---|---|---|---|---|---|---|
| Composition (%): |  |  |  |  |  |  |
| HEMA | 43.6 | 34.6 | 20.6 | 43.6 | 34.6 | 20.6 |
| DMA | 20 | 20 | 20 | 20 | 20 | 20 |
| PEG 4500XL | 16 | 16 | 16 | 16 | 16 | 16 |
| BPA890 | 8 | 8 | 8 | 8 | 8 | 8 |
| MC mPEG 2000 | 12 | 21 | 35 | 12 | 21 | 35 |
| Darocur 1173 | 0.4 | 0.4 | 0.4 | 0.4 | 0.4 | 0.4 |
| Diluent (%): |  |  |  |  |  |  |
| Photonol 7025 | 50 | 50 | 50 | 50 | 50 | 50 |
| GLUCAM E-20 | 50 | 50 | 50 | 50 | 50 | 50 |
| Mon./Dil. Ratio | 55:45 | 55:45 | 55:45 | 45:55 | 45:55 | 45:55 |
| Properties: |  |  |  |  |  |  |
| Modulus (psi) | 76 | 77 | 75 | 51 | 44 | 47 |
| % Elongation | 148 | 113 | 117 | 142 | 119 | 128 |
| Dk | 37 | 42 | 50 | 40 | 47 | 55 |
| Water Content (%) | 70.5 | 73.8 | 78.1 | 72.9 | 76.6 | 80.3 |
| Hydrogel | Clear | Clear | Clear | Clear | Clear | Clear |

|  | Examp. 115 | Examp. 116 | Examp. 117 | Examp. 118 | Examp. 119 | Examp. 120 |
|---|---|---|---|---|---|---|
| Composition (%) |  |  |  |  |  |  |
| HEMA | 36.6 | 27.6 | 13.6 | 36.6 | 27.6 | 13.6 |
| DMA | 20 | 20 | 20 | 20 | 20 | 20 |
| PEG 4500XL | 16 | 16 | 16 | 16 | 16 | 16 |
| BPA890 | 15 | 15 | 15 | 15 | 15 | 15 |
| MC mPEG 2000 | 12 | 21 | 35 | 12 | 21 | 35 |

-continued

| | | | | | | |
|---|---|---|---|---|---|---|
| Darocur 1173 | 0.4 | 0.4 | 0.4 | 0.4 | 0.4 | 0.4 |
| Diluent (%): | | | | | | |
| Photonol 7025 | 50 | 50 | 50 | 50 | 50 | 50 |
| GLUCAM E-20 | 50 | 50 | 50 | 50 | 50 | 50 |
| Mon./Dil. Ratio | 55:45 | 55:45 | 55:45 | 45:55 | 45:55 | 45:55 |
| Properties: | | | | | | |
| Modulus (psi) | 130 | 126 | 125 | 87 | 90 | 85 |
| % Elongation | 96 | 81 | 68 | 122 | 90 | 78 |
| Dk | 29 | 33 | 50 | 40 | 47 | 55 |
| Water Content (%) | 64.7 | 68.2 | 78.1 | 72.9 | 76.6 | 80.3 |
| Hydrogel | Clear | Clear | Clear | Clear | Clear | Clear |

What is claimed is:

1. A process for producing shaped hydrogel articles which comprises the steps of:

(1) molding or casting a polymerization mixture comprising:

(a) a monomer mixture comprising a major proportion of one or more hydrophilic monomers, and one or more crosslinking monomers; and (b) an inert, displaceable, non-aqueous diluent comprising an ethoxylated $C_{3-6}$ alkanetriol;

under conditions to polymerize said monomer mixture to produce a shaped gel of a copolymer of said monomers and said diluent; and (2) thereafter replacing said diluent with water, provided that said inert, displaceable, non-aqueous diluent is selected such that when said polymerization mixture is polymerized in a photo differential scanning calorimeter wherein said polymerization is induced by ultraviolet irradiation at a light intensity of from about 2.5 to 3 mW/cm$^2$, the time to maximum exotherm of said polymerization is within the range of from about 0.2 to about 3.5 minutes and the percent conversion to polymer of the monomer mixture at maximum exotherm is at least 40 percent.

* * * * *